Sept. 3, 1963 R. B. BASHAM ETAL 3,102,424
LIQUID VOLUME MEASURING DEVICES
Filed Nov. 2, 1961

INVENTORS.
Raymond B. Basham
BY Freeman F. Gross
Wm. T. Wofford
Attorney

United States Patent Office 3,102,424
Patented Sept. 3, 1963

3,102,424
LIQUID VOLUME MEASURING DEVICES
Raymond B. Basham, 2937 5th Ave., and Freeman F. Gross, Rte. 9, Box 162, both of Fort Worth, Tex.
Filed Nov. 2, 1961, Ser. No. 149,553
2 Claims. (Cl. 73—202)

Our invention relates to liquid measuring apparatus and more particularly to devices for measuring the amount of milk delivered by a cow at a selected milking.

The science of dairy husbandry has advanced to the state where, in the modern dairy at the present time, milk is never touched by human hands. In fact, the cows are fed and milked in groups in a milking area and the milk flows directly from the cows into a milk manifold pipeline system and without further attention is delivered into refrigerated bulk storage tanks. All walking, carrying of milk, the washing of milk pails and the exposure of raw milk to the atmosphere in the milking area is eliminated. Throughout the entire milk manifold pipeline system the milk moves under the most sanitary conditions. However, the employment of such a system has made it difficult to measure accurately the amount of milk produced by each cow at a milking time. It is important for the dairyman to be able to measure accurately the milk produced by each cow so that he may increase or decrease the amount of feed furnished to the particular cow in proper relation to the amount of milk produced by that cow. Such measurement capability can mean the difference between profit and loss in dairy operation.

Heretofore, and in the prior art of which I am aware, there has not been available any entirely satisfactory liquid volume measuring device for the above purpose. Some measuring devices that are well known to those skilled in dairy husbandry have included pump stroke counters, pails suspended from scales, and the like. These prior art measuring devices have not been ideal, either from the sanitation or from the reliability and accuracy standpoints.

It is accordingly the general object of the present invention to provide improved liquid volume measuring devices which are effective for measuring the amount of milk produced by a cow during a milking time.

Another object of the invention is to provide an effective proportional liquid volume measuring device for the above purpose which is completely sealed so that the liquid therein is not subject to contamination from outside sources.

Another object of the invention is to provide a proportional liquid volume measuring device for the above purpose which has a simple durable structure and is economical to manufacture.

Another object of the invention is to provide a proportional liquid volume measuring device for the above purpose which effects accurate measurements.

Another object of the invention is to provide a proportional liquid volume measuring device for the above purpose which is adaptable for taking a liquid sample without affecting the accuracy of the liquid measurement.

Another object of the invention is to provide a proportional liquid volume measuring device for the above purpose wherein the amount of liquid produced is indicated on a graduated scale.

Another object of the invention is to provide a proportional liquid volume measuring device for the above purpose which has no moving parts and which can be cleaned and sterilized without being dismantled.

These and other objects are effected by the invention as will be apparent from the accompanying drawings, forming a part of this specification, in which.

Figure 1:
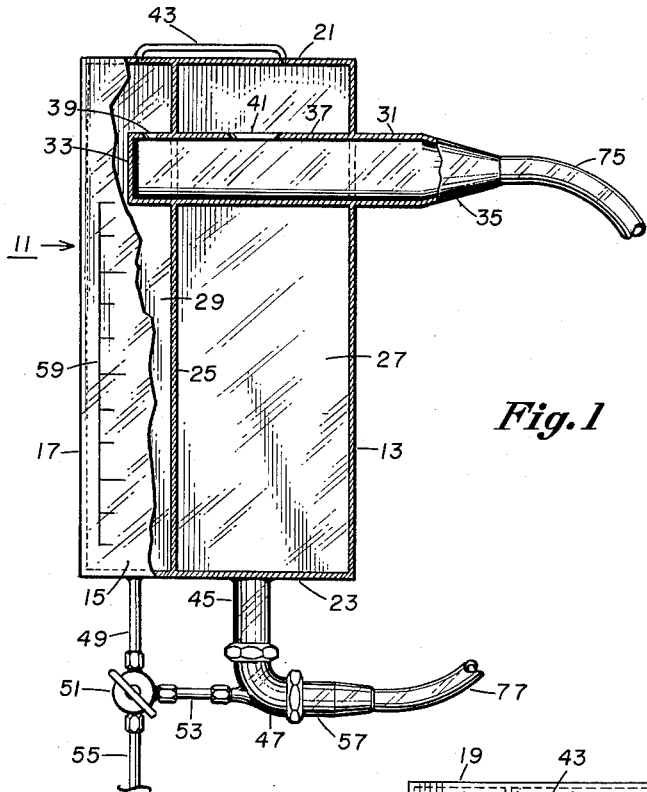
FIG. 1 is a schematic elevational view of a proportional liquid volume measuring device in accordance with a preferred embodiment of the invention with the near side partially cut away.

Referring now to the drawings, in FIG. 1 there is shown a proportional liquid volume measuring device 11 (sometimes hereinafter referred to as the measuring device 11) constructed in accordance with the present invention which includes four rectangular sides 13, 15, 17, 19, preferably of thin transparent material, a top 21, a bottom 23 and an internal subdividing partition 25 of similar construction and material as the sides. The subdividing partition 25 is parallel to the front side 13 and is perpendicularly disposed to parallel sides 15, 19 and forms within the measuring device 11 two chambers 27, 29. The larger chamber 27 is the flow chamber and the smaller chamber 29 is the measuring chamber. The joints formed by the intersecting respective sides, 13, 15, 17, 19 and the joints formed by the sides with the top 21, the bottom 23 and the subdividing partition 25 are sealed fluid-tight.

Near the top of the measuring device 11 an input tube 31 is introduced into chambers 27, 29 by piercing side 13, and subdividing partition 25 in a substantially perpendicular manner. The input tube 31 is substantially square in cross section and is made of relatively thin material. The end of the input tube within chamber 29 is closed and sealed fluid-tight by end plate 33. The opposed end of the input tube 31 projects outside of the measuring device 11, and is attached to a reducer 35. Near the closed end of the input tube 31 and in the top side 37 thereof and within the measuring chamber 29, there is a ratio orifice 39. Within the flow chamber 27 and in the top side 37 of the input tube 31 is another larger ratio orifice 41. Ratio orifice 41 in the embodiment shown is made approximately 48 times larger than ratio orifice 39 as will be hereinafter explained.

Extending across the top 21 of the measuring device 11 there is a tube 43, one end of which pierces the top 21 in chamber 27 while the other end pierces the top 21 in chamber 29. The bottom 23 within the flow chamber 27 is pierced by one end of a pipe 45 to the other end of which there is connected a conduit fitting 47. The bottom 23 within the measuring chamber 29 is pierced by one end of a tube 49 the other end of which is connected to one outlet of a three-way valve 51. Another outlet of the three-way valve is connected by a tube 53 to an outlet of the conduit fitting 47. Another outlet of the three-way valve 51 is connected to a sampling tube 55 of any convenient length. The third outlet of the conduit fitting 47 is connected to a reducer 57.

On one side of the measuring chamber 29 there is a graduated scale 59 calibrated to read in gallons or pounds or in any other convenient units of measurement.

Figure 3:
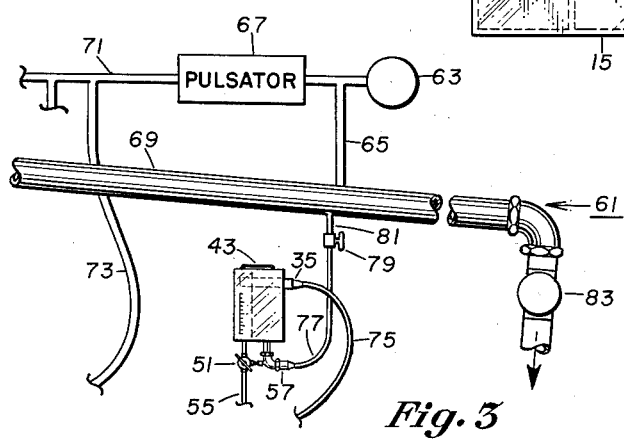
FIG. 3 is a schematic view showing a portion of a modern milk manifold system wherein a measuring device of the present invention is utilized.

Now in order to describe the manner in which the measuring device 11 is used to measure the quantity of milk delivered by a cow at each milking, reference is made to FIG. 3. A modern milk manifold pipeline system 61 includes a vacuum pump 63 motivated by a suitable prime mover (not shown) which is connected by a tubing system 65 to a pulsator 67 and to a milk manifold pipeline 69. The milk manifold pipeline is inclined downwardly at a small angle which allows the milk therein to flow by gravity to a refrigerated collecting tank (not shown). The pulsator 67 is connected to a pulsator manifold 71 having a plurality of connections so that several cows can be milked simultaneously. One end of the tube 73 is connected to the teat cups at a milking station (not shown). Flow tube 75 connects the same teat cups with the reducer 35. Tube 77 connects the reducer 57 with a stopcock 79 which is joined to the bottom of the milk manifold pipeline 69 by tube 81. A release valve 83 is incorporated in the milk manifold pipeline 69 downstream from the point where the tube 81 enters the milk manifold pipeline 69, for a purpose to be presently explained.

When the vacuum pump 63 is operating, it causes the pulsator 67 to function and by means of the tubing system 65 it produces a slight negative pressure or vacuum in the milk manifold pipeline 69. During a milking operation the stip-cock 79 is open an dthe three-way valve 51 is closed. The slight negative pressure or vacuum in the milk manifold pipeline 69 therefore, is also produced in the flow chamber 27 via the tube 77, reducer 57, conduit fitting 47 and pipe 45. Since the flow chamber 27 is interconnected with the measuring chamber 29 via the tube 43 and ratio orifice 41, input tube 31 and ratio orifice 39, the same slight negative pressure or vacuum is produced in the measuring chamber 29. The same slight negative pressure or vacuum is also produced in flow tube 75 by virtue of its connection to input tube 31.

Milk which the cow produces enters flow tube 75 and, because of the slight negative pressure or vacuum, flows into the input tube 31. After the input tube has filled completely, the milk continues to flow through the ratio orifice 41 into flow chamber 27 and a proportionate amount will also flow through the ratio orifice 39 into the measuring chamber 29.

Milk which flows through ratio orifice 41 into the flow chamber 23 is educted therefrom through the pipe 45, the conduit fitting 47, the reducer 57, the tube 77, the stopcock 79 and the tube 81 into the milk manifold pipeline 69. Milk which flows through ratio orifice 39 into measuring chamber 29 accumulates therein during the milking of the cow since the three-way valve 51 is closed. When the milking process is concluded the total amount of milk produced by the cow can be read on the graduated scale 59.

Release valve 83 opens and closes intermittently and automatically, and dumps the milk that is in the milk manifold pipeline 69 into a storage tank (not shown).

When it is desired to draw a sample of milk for testing purposes or for inspection thereof, the stop-cock 79 is closed first and then the three-way valve 51 is opened so that the sample of milk will flow from the measuring chamber 29 through the three-way valve and the sampling tube 55 into a receptacle. Thus, the withdrawing of a sample of milk is easily accomplished without affecting the accuracy of the liquid measurement.

The measuring device 11 may be easily cleaned and sterilized without dismantling, in the following manner:

Clean water, at first cold then warm, is introduced into the milk manifold pipeline 69 from which it flows via pipe 81, valve 79, tube 77, pipe fitting 47 and pipe 45 into the flow chamber 27, and by tube 53, three-way valve 51 and tube 49 into the measuring chamber 29. When the water reaches the level of the ratio orifices 39, 41, it flows therethrough into the input tube 31. In order to clean the tube 43 it is necessary to close the three-way valve 51 so that the water will enter the measuring chamber from the ratio orifice 39 and via tube 43. It is observed that the measuring device 11 is cleansable and sterilizable without exposing the interior to possible contamination from the atmosphere in the milking area.

It has been found desirable to limit the size of the measuring device 11 to a flow measuring capacity of approximately 48 pints, because this is the maximum amount of milk any cow would normally be expected to produce at one milking period. The size of the measuring chamber 29 is related to the flow measuring capacity of the device 11 in the ratio of the size of the ratio orifices 39, 41. If the capacity of the measuring chamber 29 is approximately one pint, then the flow-measuring capacity of the device 11 will be 48 pints. The measuring chamber can of course be made to have any convenient size or shape so long as its capacity is sufficiently great to handle the largest proportionate volume of liquid expected to be produced during a given measuring operation. Also, the flow chamber can have any convenient size or shape so long as the pipe 45 is large enough to allow the liquid to flow out of the flow chamber 27 approximately as fast as it flows thereinto via the ratio orifice 41.

The input tube 31 is illustrated as being substantially square in cross section having the top 37 disposed parallel to the top 21 of the device 11. It is not intended thereby to limit the configuration of the input tube 31 to a square cross section. It may be round, square, rectangular, triangular or of practically any cross sectional shape, provided however, that either and preferably the ratio orifices 39, 41 are disposed in planar portions of the input tube 31 and in a common horizontal plane, or their lower margins are disposed at a common level.

In a milk manifold pipeline system 61 the flow of the milk due to the action of the pulsator is not a steady flow, but is a pulsating flow. In order to obtain the most accurate measurements in such pulsating flow system it is essential that the ratio orifices 39, 41 be located in planar portions of the input tube surface and in a common horizontal plane. When the ratio orifices 39, 41 are so located and the input tube is filled with milk, any additional quantity of milk which flows therein under the action of the pulsator, must displace the same quantity of milk through the ratio orifices 39, 41.

Figure 2:
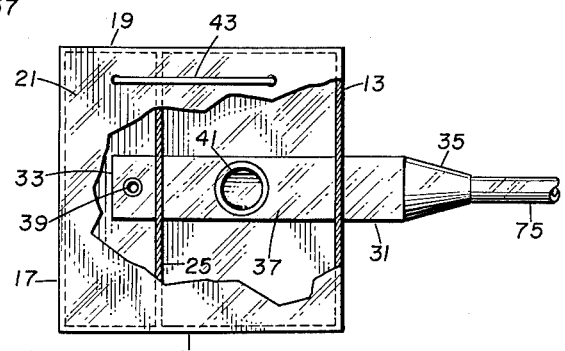
FIG. 2 is a schematic plan view of the proportional liquid volume measuring device of FIG. 1, with the top thereof partially cut away.

In the device illustrated in FIGS. 1 and 2, the tube 43 externally connects the flow chamber 27 and the measuring chamber 29. The purpose of this tube 43 is to equalize the slight negative pressure or vacuum in the chambers. If desired, the conduit corresponding to the tube 43 may be located in the subdividing partition 25, provided that it is above the input tube 31 and is displaced from the ratio orifices 39, 41 a sufficient distance to prevent any spillage of milk from the ratio orifices 39, 41 from entering the conduit. Also, the conduit corresponding to the tube 43 may have one end thereof disposed below the liquid level in either the flow chamber 27 or the measuring chamber 29 so long as the other end thereof is disposed above the upper end of the graduated scale 59.

While the device illustrated in FIG. 1 shows two adjacent rectangular chambers 27, 29 having a common subdividing partition 25, the shape and the location of the chambers need not necessarily be so limited. The flow chamber may be separate and apart from the measuring chamber and they may be of any convenient shape provided that the ratio orifices 39, 41 are disposed and arranged in the manner disclosed hereinbefore.

While we have shown the invention in only one form, it will be obvious to those skilled in the art that it is not so limited, but is susceptible of various changes and modifications without departing from the spirit thereof.

We claim:

1. A device for proportionately measuring the volume of the liquid in a pulsating liquid flow system comprising, a flow chamber, a measuring chamber, an input conduit internally interconnecting said flow chamber and said measuring chamber, an orifice located in the upper peripheral portion of said input conduit within said flow chamber, a proportionately smaller orifice located in the upper peripheral portion of said input conduit within said measuring chamber, with the lower margins of said orifices being disposed at a common level, and means for indicating the volume of fluid in said measuring chamber.

2. A device for proportionately measuring the volume of the liquid in a pulsating liquid flow system comprising, a flow chamber, a measuring chamber, means for applying a partial vacuum to said chambers, an input conduit internally interconnecting said flow chamber and said measuring chamber, an orifice located in the upper peripheral portion of said input conduit within said flow chamber, a proportionately smaller orifice located in the upper peripheral portion of said input conduit within said measuring chamber, with the lower margins of said orifices being disposed at a common level, passage means communicating between said flow chamber and said measuring chamber above the liquid levels in said chambers, and means for indicating the volume of fluid in said measuring chamber.

References Cited in the file of this patent
UNITED STATES PATENTS

| | | |
|---|---|---|
| 2,625,041 | Hein | Jan. 13, 1953 |
| 3,013,431 | Splettstoeser | Dec. 19, 1961 |